United States Patent
Rommel et al.

(10) Patent No.: US 9,065,271 B2
(45) Date of Patent: Jun. 23, 2015

(54) PROTECTIVE CIRCUIT IN A WINDSCREEN WIPER DRIVE AND WINDSCREEN WIPER DRIVE

(75) Inventors: Marco Rommel, Untergruppenbach (DE); Peter Kiersten, Oberstenfeld (DE); Armin Schubert, Sersheim (DE)

(73) Assignee: Valeo Systémes d'Essuyage, La Verriére (FR)

( * ) Notice: Subject to any disclaimer, the term of this patent is extended or adjusted under 35 U.S.C. 154(b) by 72 days.

(21) Appl. No.: 13/976,561

(22) PCT Filed: Dec. 8, 2011

(86) PCT No.: PCT/EP2011/072151
§ 371 (c)(1),
(2), (4) Date: Jun. 27, 2013

(87) PCT Pub. No.: WO2012/089480
PCT Pub. Date: Jul. 5, 2012

(65) Prior Publication Data
US 2013/0271881 A1  Oct. 17, 2013

(30) Foreign Application Priority Data
Dec. 29, 2010  (DE) .................. 10 2010 056 361

(51) Int. Cl.
*H02P 1/54* (2006.01)
*H02H 9/04* (2006.01)
*H02H 7/08* (2006.01)

(52) U.S. Cl.
CPC ............... *H02H 9/04* (2013.01); *H02H 7/0811* (2013.01)

(58) Field of Classification Search
CPC ........................................................ H02H 9/04
USPC .................. 361/23, 33; 318/558, 34
See application file for complete search history.

(56) References Cited

U.S. PATENT DOCUMENTS

| 3,604,885 | A | * | 9/1971 | Inoue ........................ 219/69.18 |
| 4,398,135 | A | * | 8/1983 | Busch et al. ................... 318/443 |
| 4,463,294 | A | * | 7/1984 | Gibson ......................... 388/812 |
| 4,663,575 | A | * | 5/1987 | Juzswik et al. ............... 318/444 |
| 4,795,951 | A | * | 1/1989 | Gaebel et al. ................ 318/293 |
| 6,548,978 | B1 | * | 4/2003 | Lauk et al. .................... 318/460 |

FOREIGN PATENT DOCUMENTS

CN  200 964 101 Y  10/2007
DE  3930539 A1  3/1991

(Continued)

OTHER PUBLICATIONS

International Search Report issued in PCT/EP2011/072151 mailed on May 3, 2012 (2 pages).

(Continued)

*Primary Examiner* — David S Luo
(74) *Attorney, Agent, or Firm* — Osha Liang LLP

(57) ABSTRACT

The invention relates to a protective circuit (10) in a screen wiper drive (1), consisting of a parallel circuit having two circuit elements (16, 17), wherein one circuit element (16) consists of a capacitor (18) and the other circuit element (17) consists of a series-connection of a diode (19) and a Zener diode (20), wherein the forward direction of the diode (19) and the Zener diode (20) is different and the Zener diode (20) inhibits in the direction of a plus pole.

9 Claims, 1 Drawing Sheet

(56) References Cited

FOREIGN PATENT DOCUMENTS

| | | | |
|---|---|---|---|
| DE | 19845862 | A1 | 4/2000 |
| DE | 10 2009 003019 | A1 | 11/2010 |
| EP | 0268770 | A1 | 6/1988 |
| EP | 1 176 067 | A2 | 1/2002 |

OTHER PUBLICATIONS

German Search Report issued in corresponding German Application No. 10 2010 056 361.7 dated Jul. 18, 2011 (8 pages).

* cited by examiner

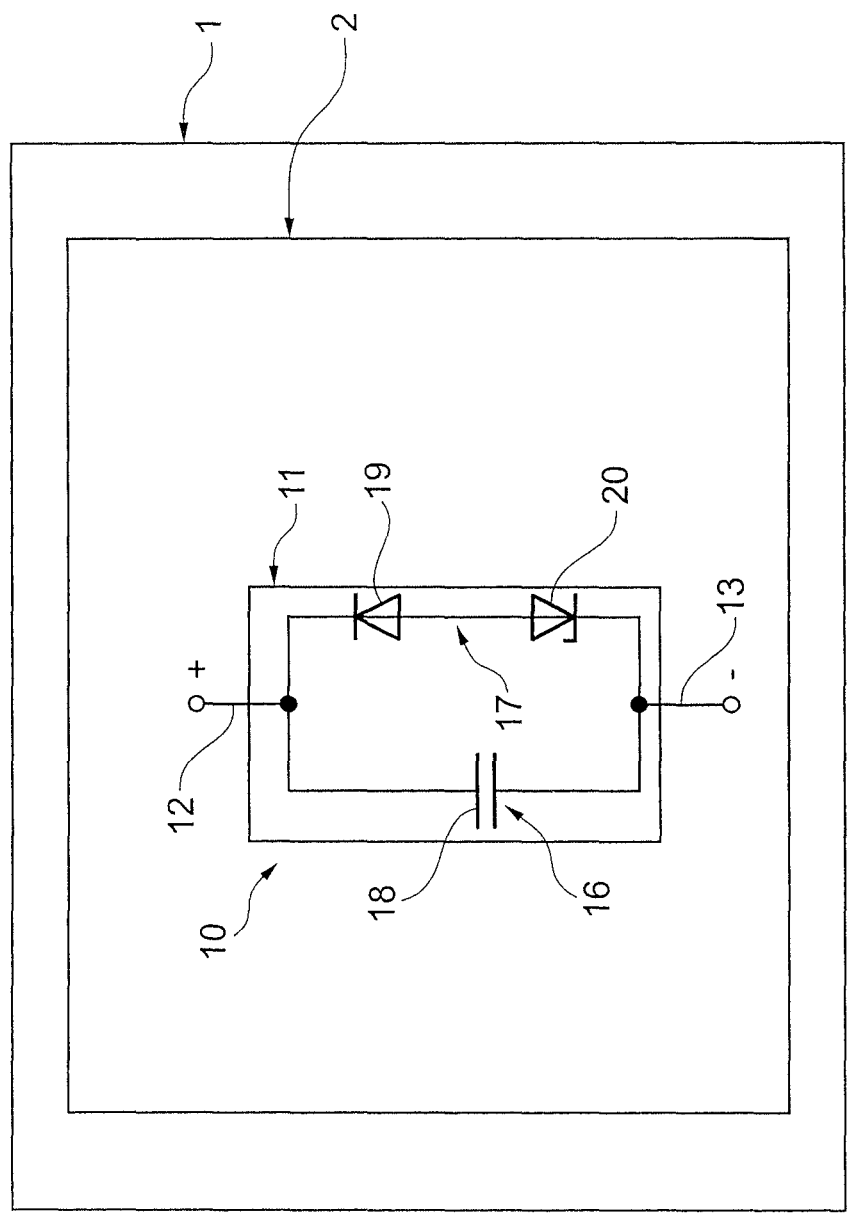

PROTECTIVE CIRCUIT IN A WINDSCREEN WIPER DRIVE AND WINDSCREEN WIPER DRIVE

PRIOR ART

The invention relates to a protective circuit in a screen wiper drive and a screen wiper drive having a protective circuit according to the invention, according to the features of the independent claims.

A protective circuit in a screen wiper drive known from practice consists of a capacitor and a varistor parallel-connected thereto. Voltage peaks can in particular be reduced by means of such a protective circuit. Such protective circuits are in particular used in screen wiper motors of screen wiper drives which have a nominal voltage of 12 V or 24 V. In order to allow starting of the motor in particular during difficulties starting the motor vehicle, it is customary in practice to operate the on-board power supply and thus also the starter motor at an increased voltage, for example a voltage of up to 27 V (60 V) instead of the usual on-board voltage of 12 V (24 V), by means of an external current source. Although in this case voltage peaks can be reduced by means of the protective circuit known from practice, the known protective circuit has its limits, in particular where the control system of the screen wiper drive is in a position which provides wiping of a vehicle screen at increased speed (level 2). In contrast, what is known as a "jump start" with increased on-board voltage in level 1 of the screen wiper drive, in which the latter is operated at a normal wiping speed (level 1), is possible without problems.

As the manufacturer of a screen wiper drive supplies different automotive manufacturers with a wide variety of vehicle-specific designs of a screen wiper drive, there is a desire to configure the protective circuits used identically in order to be able to reduce the production costs of the screen wiper drives, the intention being for the protective circuit to cover all possible cases with respect to the reduction of voltage peaks.

DISCLOSURE OF THE INVENTION

Proceeding from the prior art described, the invention is based on the object of configuring a protective circuit in a screen wiper drive in such a manner that it always provides enough reserves to be able to compensate the above-mentioned increased voltage peaks caused by increased on-board voltage without damage to the protective circuit or other components of the screen wiper drive, independently of the nominal voltage of the screen wiper motor and independently of the respective automotive manufacturer or vehicle-specific use. This object is achieved in a protective circuit in a screen wiper drive with the features of claim 1.

Advantageous developments of the protective circuit according to the invention in a screen wiper drive are specified in the subclaims. All combinations of at least two features disclosed by the claims, description and/or figures fall within the scope of the invention.

The use of the protective circuit when it is arranged in the screen wiper motor is particularly preferred.

A unipolar brush-type DC motor is preferably considered as the screen wiper motor, as it is inexpensive to produce and is known in a wide variety of embodiments from the prior art.

For economical production and assembly of the protective circuit, it is particularly preferable for the components of the protective circuit to be arranged in a common, in particular cast, housing, the housing having two electrical connections which can in particular be soldered to a carrier element.

It has been found sufficient for overvoltages known from practice if the diode has a reverse voltage of between 400 V and 1000 V, preferably 1000 V, while the Zener diode has a reverse voltage of between 33 V and 50 V, preferably 39 V.

The invention also comprises a screen wiper drive, in particular a screen wiper motor, having a protective circuit according to the invention. In this case it is provided for the screen wiper motor to have a nominal voltage of 12 V or 24 V, an on-board power supply which is connected to the screen wiper drive being briefly operated at an overvoltage of up to 27 V or 60 V with the increased nominal voltage.

With the latter parameters, the protective circuit can compensate overvoltages with which the voltage induced in the protective circuit is up to 70 V, in particular 50 V.

Further advantages, features and details of the invention can be found in the following description of preferred exemplary embodiments and using the drawing.

The single FIGURE shows a simplified diagram of a protective circuit according to the invention for use in a screen wiper motor of a screen wiper drive.

The single FIGURE shows a protective circuit 10 according to the invention, as is used in a screen wiper drive 1, in particular in a screen wiper motor 2. The screen wiper motor 2 is in particular a unipolar brush-type DC motor with a nominal voltage of 12 V or 24 V.

The protective circuit 10 is in particular arranged inside the screen wiper motor 2, preferably in the region of the brushes of the screen wiper motor 2, at a suitable point, for example on a circuit carrier. To this end, the protective circuit 10 is arranged inside a unit 11, the electronic components of the protective circuit 10 which are described in more detail below being arranged inside the unit 11 in a housing (not shown), and the housing being for example cast by means of a corresponding mould resin to prevent the ingress of moisture or media into the components. The unit 11 has two connecting feet 12, 13 for connection to the rest of the circuit of the screen wiper motor 2 or screen wiper drive 1, which feet can be connected, in particular soldered, to a plus pole and a minus pole.

The protective circuit 10 is configured as a parallel circuit and consists of two circuit elements 16, 17. One circuit element 16 is configured as a capacitor 18. The capacitor 18 has in particular a capacitance of 1 µF. The other circuit element 17 comprises a diode 19 and a Zener diode 20 in a series connection. The arrangement of the diode 19 and the Zener diode 20 is such that they inhibit in different directions of the circuit, the Zener diode 20 inhibiting in the direction of the plus pole of the circuit. The diode 19 has a reverse voltage of between 400 V and 1000 V, preferably 1000 V. The Zener diode 20 is a Zener diode 20 with a reverse voltage of between 33 V and 50 V, preferably 39 V.

Voltage peaks, as occur when when the screen wiper motor 1 is switched off, are reduced by means of the protective circuit 10 according to the invention. If voltage peaks occur briefly during operation, this has no effect on the functionality of the protective circuit 10 as long as these voltage peaks are below the breakdown voltage of the diode 19.

If the motor is connected to the wrong poles, the protective circuit 10 is likewise not destroyed if the operating voltage is less than the total of the Zener diode voltage and the forward voltage of the diode 19.

LIST OF REFERENCE SYMBOLS

1 Screen wiper drive
2 Screen wiper motor
10 Protective circuit

11 Unit
12 Connecting foot
13 Connecting foot
16 Circuit element
17 Circuit element
18 Capacitor
19 Diode
20 Zener diode

The invention claimed is:

1. A protective circuit in a windscreen wiper drive comprising:
   a parallel circuit with two circuit elements, one of the two circuit elements comprising a capacitor, and another of the two circuit elements comprising a series connection of a diode and a Zener diode, a conducting direction of the diode and the Zener diode being different and the Zener diode blocking conduction in a direction of a positive pole,
   wherein the diode has a cut-off voltage of between 400V and 1000V and the Zener diode has a cut-off voltage of between 33V and 50V.

2. The protective circuit according to claim 1, wherein the protective circuit is arranged in a windscreen wiper motor.

3. The protective circuit according to claim 2, wherein the windscreen wiper motor is configured as a unipolar-operated brush-type DC motor.

4. The protective circuit according to claim 3, wherein the protective circuit is arranged in a region in the vicinity of the brushes on a printed circuit board.

5. The protective circuit according to claim 1, wherein the structural elements of the protective circuit are arranged in a common sealed housing which has two electrical terminals which is soldered to a support element.

6. The protective circuit according to claim 1, wherein the capacitor has a capacitance of 1 μF.

7. A windscreen wiper drive having a windscreen wiper motor, comprising a protective circuit according to claim 1.

8. The windscreen wiper drive according to claim 7, wherein the windscreen wiper motor has a rated voltage of 12V or 24V, and wherein an on-board power supply connected to the windscreen wiper drive is briefly operated at an increased voltage relative to the rated voltage of up to 27V in the case of the 12V motor, and 60V in the case of the 24V motor.

9. The windscreen wiper drive according to claim 8, wherein, during the operation of the on-board power supply at excess voltage, when switching off the windscreen wiper motor a voltage of up to 50V, is induced into the protective circuit.

\* \* \* \* \*